(12) United States Patent
Suzuki et al.

(10) Patent No.: US 7,353,733 B2
(45) Date of Patent: Apr. 8, 2008

(54) TRANSMISSION APPARATUS FOR AUTOMOBILE OR THE LIKE

(75) Inventors: Hiroyuki Suzuki, Nishio (JP); Yasuhisa Suzuki, Kariya (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 37 days.

(21) Appl. No.: 11/295,440

(22) Filed: Dec. 7, 2005

(65) Prior Publication Data

US 2006/0123944 A1 Jun. 15, 2006

(30) Foreign Application Priority Data

Dec. 10, 2004 (JP) ............................. 2004-358482

(51) Int. Cl.
 *F16H 57/04* (2006.01)
 *F16H 57/02* (2006.01)
(52) U.S. Cl. .................... 74/606 R; 475/159; 184/6.12
(58) Field of Classification Search ............. 74/606 R, 74/607, 467; 184/6.24, 11.2, 6.12; 475/159, 475/160
 See application file for complete search history.

(56) References Cited

U.S. PATENT DOCUMENTS 2,822,705 A * 2/1958 Orr et al. .................... 475/160
4,244,242 A * 1/1981 Uno et al. ................... 475/160
4,261,219 A * 4/1981 Suzuki et al. .................. 74/467
4,903,798 A * 2/1990 Takemoto et al. ......... 184/6.24
6,398,687 B2 * 6/2002 Iwata ......................... 475/160
6,450,296 B1 * 9/2002 Seki et al. ................. 184/6.12
6,644,440 B2 * 11/2003 Kageyama et al. ........ 184/11.2

FOREIGN PATENT DOCUMENTS

| JP | 59-96015 | * | 6/1984 |
| JP | 2-286940 | * | 11/1990 |
| JP | 4-285356 | | 10/1992 |
| JP | 7-269684 | * | 10/1995 |
| JP | 2000-110923 | | 4/2000 |

* cited by examiner

*Primary Examiner*—Vinh T. Luong
(74) *Attorney, Agent, or Firm*—Buchanan Ingersoll & Rooney PC (57) ABSTRACT

A transmission apparatus for an automobile or the like includes: a transmission gear mechanism including, therein, a speed-reducing small gear at an axial one side of an intermediate shaft; a final driving mechanism including, therein, a speed-reducing large gear at an axial one side of an axle; a casing including: a first chamber; a second chamber; a first inner surface; a second inner surface; and a case rib; and a wall which is positioned between the first inner surface and the end surface of the speed-reducing large gear that faces the first inner surface; the wall including: a lower portion; and an edge portion, and the wall covering, at a short distance away, the end surface of the speed-reducing large gear that faces the first inner surface.

7 Claims, 6 Drawing Sheets

TRANSMISSION APPARATUS FOR AUTOMOBILE OR THE LIKE

This application is on the basis of and claims priority under 35 U.S.C. § 119 to Japanese Patent Application 2004-358482, filed on Dec. 10, 2004, the entire content of which is incorporated herein by reference.

FIELD OF THE INVENTION

This invention relates to a transmission apparatus for an automobile, or the like, a transmission apparatus which reduces energy loss caused by an agitation of lubricating oil. More particularly, the present invention pertains to a transmission apparatus for an automobile, or the like, a transmission apparatus which contains a transmission gear mechanism and a final driving mechanism in a single casing.

BACKGROUND

A known transmission apparatus for an automobile or the like is disclosed in JP2000-110923A (paragraph 0022, FIGS. 1, 3 and 7), which contains therein a transmission gear mechanism and a differential mechanism that serves as a final driving mechanism. The transmission apparatus, which basically has the structure illustrated in FIGS. 5-8, includes a transmission gear mechanism 120, a differential mechanism 125, and a casing 110. The transmission gear mechanism 120 is provided with a pinion (i.e., speed-reducing small gear) 122a, of which diameter is small, at an axial one side of a shaft, an axial one side which serves as an output side (upper side as viewed in FIG. 6). The differential mechanism 125 is provided with a ring gear (i.e., speed-reducing large gear) 126 at an axial one side (lower side as viewed in FIG. 6) of a shaft which is far away from a differential gear. The ring gear 126 is always gear-meshed with the pinion 122a. The casing 110 includes, therein, a first chamber S101 in which the transmission gear mechanism 120 is housed, and a second chamber S102 in which the differential mechanism 125 is housed. The casing 110 of this conventional transmission apparatus is mainly configured with a first case 111 and a second case 115, both of which are separated members and are fixedly connectable with each other in a liquid-tight manner. The first case 111 includes a first inner surface 110a facing, at a short distance away, an end surface of the ring gear 126 positioned at an axial outer side (lower side as viewed in FIG. 6). The second case 115 includes a second inner surface 110b facing, at a short distance away, an end surface of the pinion 122a positioned at an axial outer side (upper side as viewed in FIG. 6). The cases 111 and 115 together combine to form a portion in which the ring gear 126 is contained, and a part of an inner surface of this portion includes a semi-circular arcuate portion that is coaxially formed with the ring gear 126 and positioned at a small distance from a tip circle of the ring gear 126. Lubricating oil is stored in the bottom portions (lower portions in FIG. 5) of the first chamber S101 and the second chamber S102. Lubricating oil stored in the second chamber S102 is lifted or circulated by means of the ring gear 126 being rotated and lubricates the transmission gear mechanism 120 from the upper side (upper side in FIG. 5). This transmission apparatus also includes two intermediate shafts between the input shaft 121 and the differential mechanism 125. The intermediate shafts are respectively provided, on output sides, with the pinion 122a and a pinion 122b, which are meshed with the ring gear 126.

Figure 5:
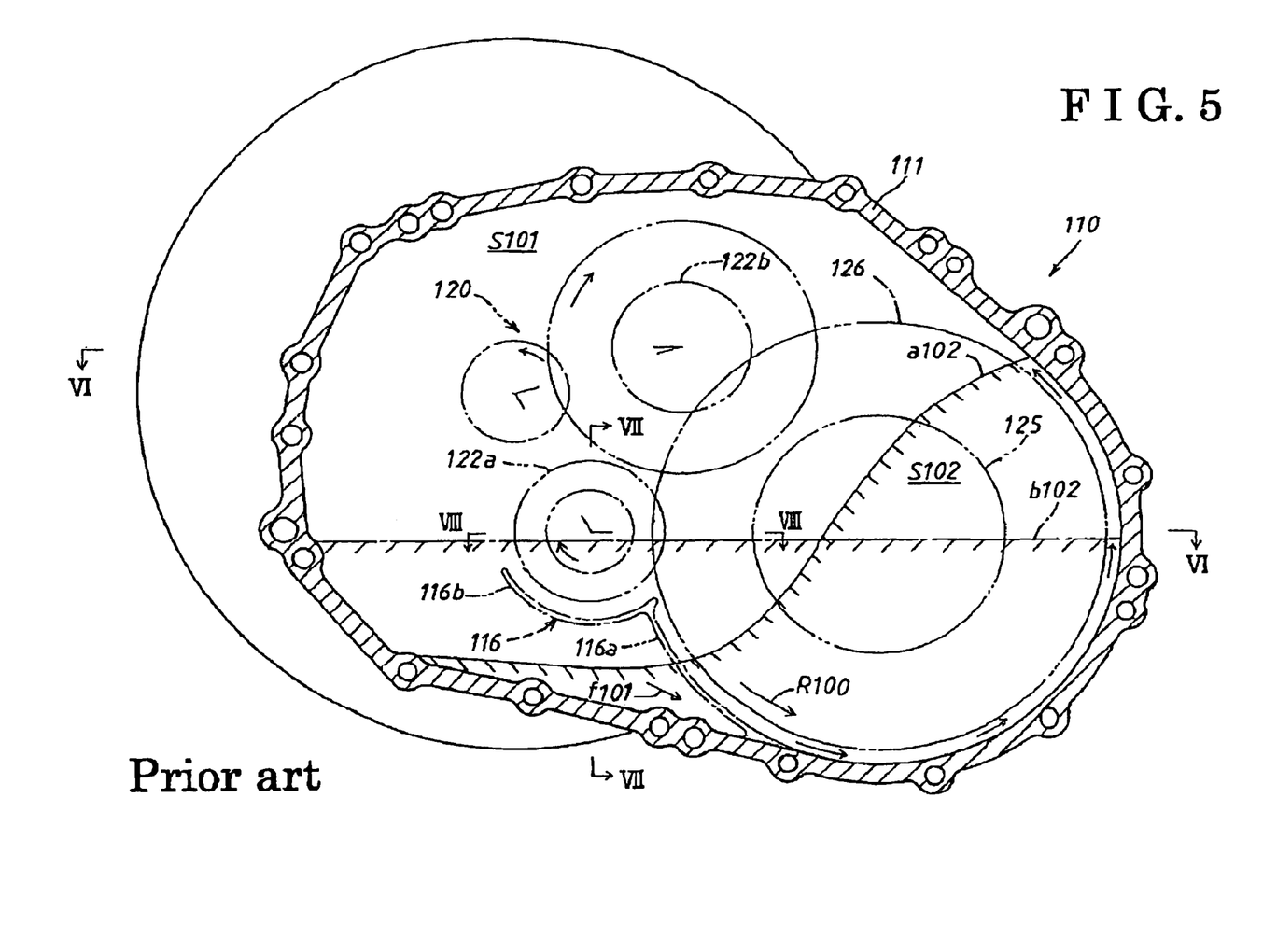

According to the aforementioned transmission apparatus, in a stationary condition of the transmission apparatus, a surface of lubricating oil stored in the casing 110 is horizontal, as is clear from the dashed line b102 shown in FIG. 5. In contrast, in an operating condition of the transmission apparatus, lubricating oil stored in the casing 110 is lifted or circulated by means of the ring gear 126, which rotates in a direction of an arrow R100 shown in FIG. 5. Thus, a surface of lubricating oil stored in the second chamber S102 is inclined in such a way as to be high in a rear portion of the second chamber S102, which is positioned at the far side of the transmission gear mechanism 120, and to be low in a front portion of the second chamber S102. Therefore, lubricating oil stored in the first chamber S101 flows, through a space between the first inner surface 110a and the second inner surface 110b, into the front portion of the second chamber S102, as indicated by arrows f101 (shown in FIG. 5) and f102 (shown in FIGS. 6 and 8). Accordingly, as indicated by a solid line a102, the surface of lubricating oil stored in the casing 110 is low in the first chamber S101, and in the front portion of the second chamber S102, and is high in a rear portion of the second chamber S102. According to the transmission apparatus with a structure as shown in FIGS. 5-8, lubricating oil flows relatively freely into the second chamber S102 from the first chamber S101, through the space between the first inner surface 110a and the second inner surface 10b. Because of the aforementioned inflow of lubricating oil, lowering of the surface of lubricating oil in the first chamber S101 is accelerated. Thus, the transmission gear mechanism 120 housed in the first chamber S101 may on occasions not sufficiently soaked or dipped in the lubricating oil, and a possibility thereby may arise of a lack of lubrication for the transmission 120. This issue can be solved by setting an increased amount of lubricating oil to be inserted into the casing 110. However, in these circumstances, a new possibility arises in so far that an energy loss (i.e., agitating loss), generated as a result of agitation or circulation of lubricating oil by means of the large diameter ring gear 126 at a time of high-speed driving, is increased. In order to reduce the degree of agitating loss, the space between the ring gear 126 and the casing 110 has conventionally been narrowed, and the part of an inner surface of the casing 110 around the ring gear 126 has been made smoother. However, unless the amount of lubricating oil inserted into the casing 110 is reduced, remarkable results cannot be expected.

Another type of transmission apparatus is known that is capable of reducing the amount of lubricating oil inserted into the casing 110, a type of transmission in which the second case 115 is provided with a case rib 116, as can be seen from a chain double-dashed line shown in FIGS. 5-8. The case rib 116 is formed so as to extend along the undersides of the pinion 122a, and of the ring gear 126, which is meshed with the pinion 122a, and so as to project from the second inner surface 110b of the second case 115 toward the first inner surface 110a. The case rib 116 includes a small circular arcuate portion 116b, which is coaxially formed with the pinion 122a and positioned therebelow, and a large circular arcuate portion 116a, which is downwardly extended from the vicinity of a front end portion of the small circular arcuate portion 116b along a circumference of the ring gear 126, and is connected to a bottom surface of the second case 115. A space e100 is defined between a tip surface of the case rib 116 and the first inner surface 110a. Within an area where the case rib 116 is provided, the respective bottom portions of the first chamber S101 and the second chamber S102 are connected to each other through the space e100. By means of the case rib 116, the bottom portions of the first chamber S101 and the second chamber S102 are divided off, except for the space e100, and in practice, there is no flow of lubricating oil indicated by the arrow f101 shown in FIG. 5. In such a condition, a flow of lubricating oil is only maintained at the upper side of the case rib 16 as indicated by arrow f102 shown in FIGS. 6 and 8, and the amount of lubricating oil that flows into the lower portion of the second chamber S102 from the lower portion of the first chamber S101 is thereby reduced. Accordingly, the degree of lowering of the surface of lubricating oil stored in the first chamber S101 resulting from the aforementioned inflow of lubricating oil is diminished, and the possibility of lack of lubrication for the transmission apparatus 120 contained in the first chamber S101 is reduced. Therefore, a pre-set value of the amount of the oil to be inserted into the casing 110 can be lowered and the agitating loss of lubricating oil caused by a rotation of the ring gear 126 at the time of high-speed driving can be thereby reduced. Moreover, a transmission apparatus provided with a case rib 116 in the casing 110 is known. However, there is no document that discloses a structure of such a transmission apparatus.

The aforementioned case rib 116 is effective to a certain degree in reducing the agitating loss of lubricating oil. However, in a case where the surface of the oil stored in the front portion of the second chamber S102 is lowered, lubricating oil stored in the first chamber S101 flows into the second chamber S102 through the space e100 between the tip surface of the case rib 116 and the first inner surface 110a, and in some cases, also through the section positioned above (upper side in FIG. 5) the case rib 116. Moreover, for purposes of avoiding interference of the case rib 116 relative to the pinion 122a and the speed-reducing large gear 126, a vertical (up and down direction in FIG. 5) position of the case rib 116 cannot be raised towards the upper side in FIG. 5. Therefore, in order to avoid loss of lubrication for the transmission apparatus 120 at a time of high-speed driving, it is necessary to set a value at a, to a degree, higher level for the amount of oil to be inserted into the casing 110. Accordingly, at a time of high-speed driving, it is difficult to avoid an increase in agitating loss caused by the rotation of the ring gear 126.

The present invention has been made in view of the above circumstances, and provides a transmission apparatus which is capable of reducing an inflow of lubricating oil from the first chamber S1 to the second chamber S2, and is capable of improving the above matters.

SUMMARY OF THE INVENTION

According to an aspect of the present invention, a transmission apparatus for an automobile or the like includes: a transmission gear mechanism including, therein, a speed-reducing small gear at an axial one side of an intermediate shaft; a final driving mechanism including, therein, a speed-reducing large gear at an axial one side of an axle, the speed-reducing large gear being engaged with the speed-reducing small gear; a casing including: a first chamber housing, therein, the transmission gear mechanism; a second chamber housing, therein, the final driving mechanism; a first inner surface facing, at a short distance away, an end surface of the speed-reducing large gear positioned at a side of the first chamber; a second inner surface facing, at a short distance away, an end surface of the speed-reducing small gear positioned at a side of the first chamber; and a case rib formed at the second inner surface, and projecting toward the first inner surface along undersides of the speed-reducing small gear, and of the speed-reducing large gear that meshes with the speed-reducing small gear, the case rib being connected to a bottom surface of the casing; and a wall which, viewed from a direction perpendicular to an axial direction of the speed-reducing large gear, is positioned between the first inner surface and the end surface of the speed-reducing large gear that faces the first inner surface; the wall including: a lower portion fixedly attached to a tip end surface of the case rib; and an edge portion arranged at a side of the differential gear mechanism and elastically in contact with the first inner surface, and the wall covering, at a short distance away, the end surface of the speed-reducing large gear that faces the first inner surface.

BRIEF DESCRIPTION OF THE DRAWINGS

The foregoing and additional features and characteristics of the present invention will become more apparent from the following detailed description considered with reference to the accompanying drawings, wherein:

FIG. 5 is a sectional side view taken along line V-V of FIG. 6 illustrating an example of a conventional transmission apparatus for an automobile or the like;

DETAILED DESCRIPTION

An embodiment of the present invention will be explained with reference to FIGS. 1-4. A transmission apparatus for an automobile or the like, according to the embodiment of the present invention includes a casing 10, and a transmission gear mechanism 20 and a differential mechanism (i.e., final driving mechanism) 25, which are both contained in the casing 10. The casing 10 further includes a wall 18 for controlling a flow volume of lubricating oil LO stored therein.

Figure 2:
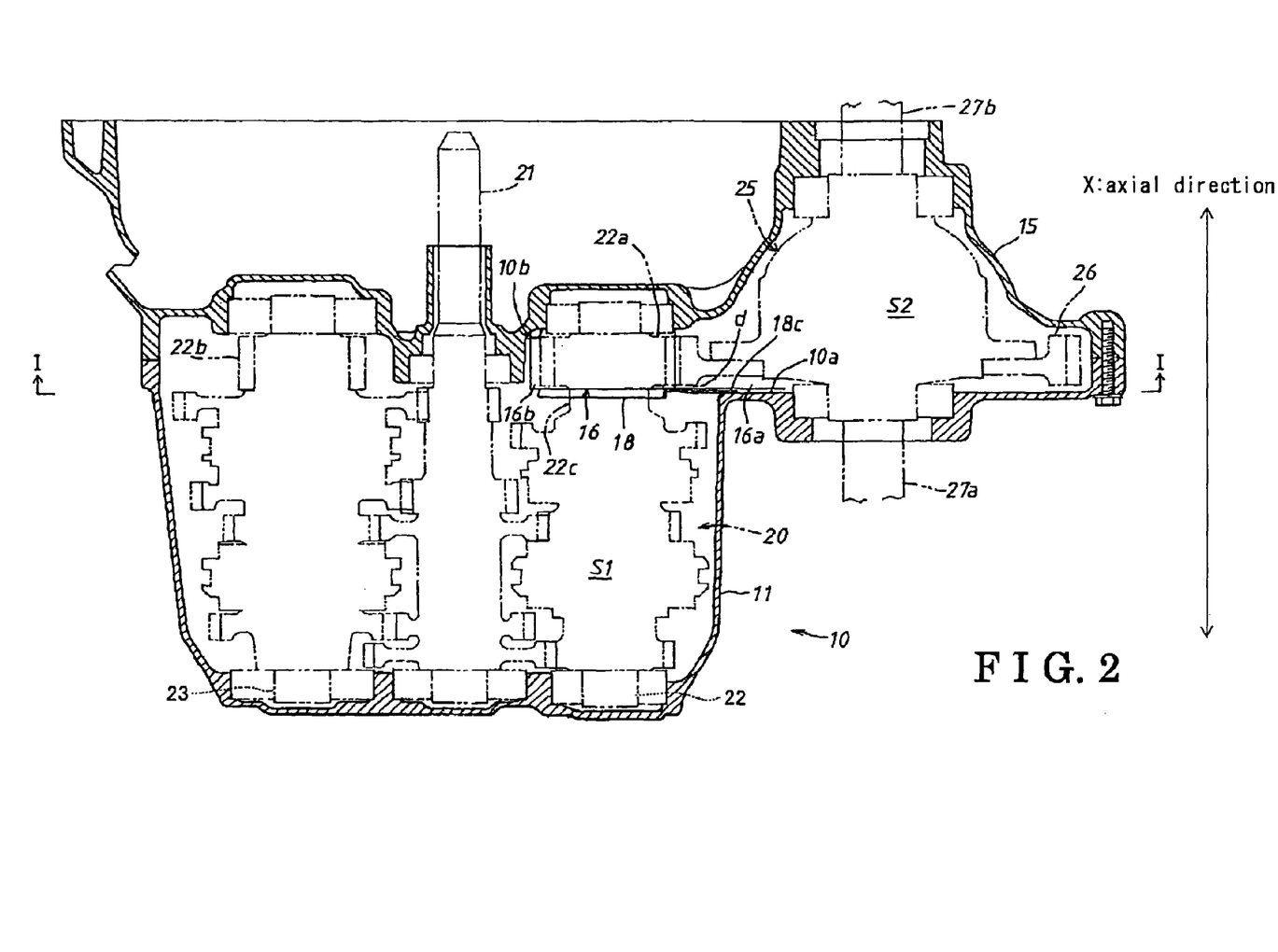
FIG. 2 is a sectional view taken along line II-II of FIG. 1.

The transmission gear mechanism 20 serving as a manual type transmission gear mechanism includes an input shaft 21, and two intermediate shafts 22, 23, that are arranged in parallel with each other and extended in an up and down direction, as shown in FIG. 2. A first intermediate shaft 22 is provided with a pinion (i.e., speed-reducing small gear) 22a at an axial one side of the shaft, an axial one side which is an output side (upper side as viewed in FIG. 2). A second intermediate shaft 23 is provided with a pinion 22b, which is positioned at the identical level as the pinion 22a in the axis line direction, at an axial one side which is an output side (upper side as viewed in FIG. 2). The differential mechanism 25 includes a rotatable axis line arranged in parallel with the input shaft 21. A ring gear (i.e., speed-reducing large gear) 26 is coaxially fixed with the differential mechanism 25 at an axial one side (lower side as viewed in FIG. 2) thereof by a screw, or the like, and meshes with the pinions 22a and 22b of the transmission gear mechanism 20, which have a virtually identical axial length to that of the ring gear 26. The differential mechanism 25 is provided with two axle shafts (i.e., output shafts) 27a and 27b respectively arranged on either end of the axis line direction. The axle shafts 27a and 27b are outwardly projected from the differential mechanism 25 and provided with wheels at each end portion. A driving force from an engine is applied to an input shaft 21, shifted by the transmission gear mechanism 20, and transmitted to the differential mechanism 25 through the pinions 22a and 22b and the ring gear 26. The wheels are then driven by means of the axle shafts 27a and 27b.

Figure 1:
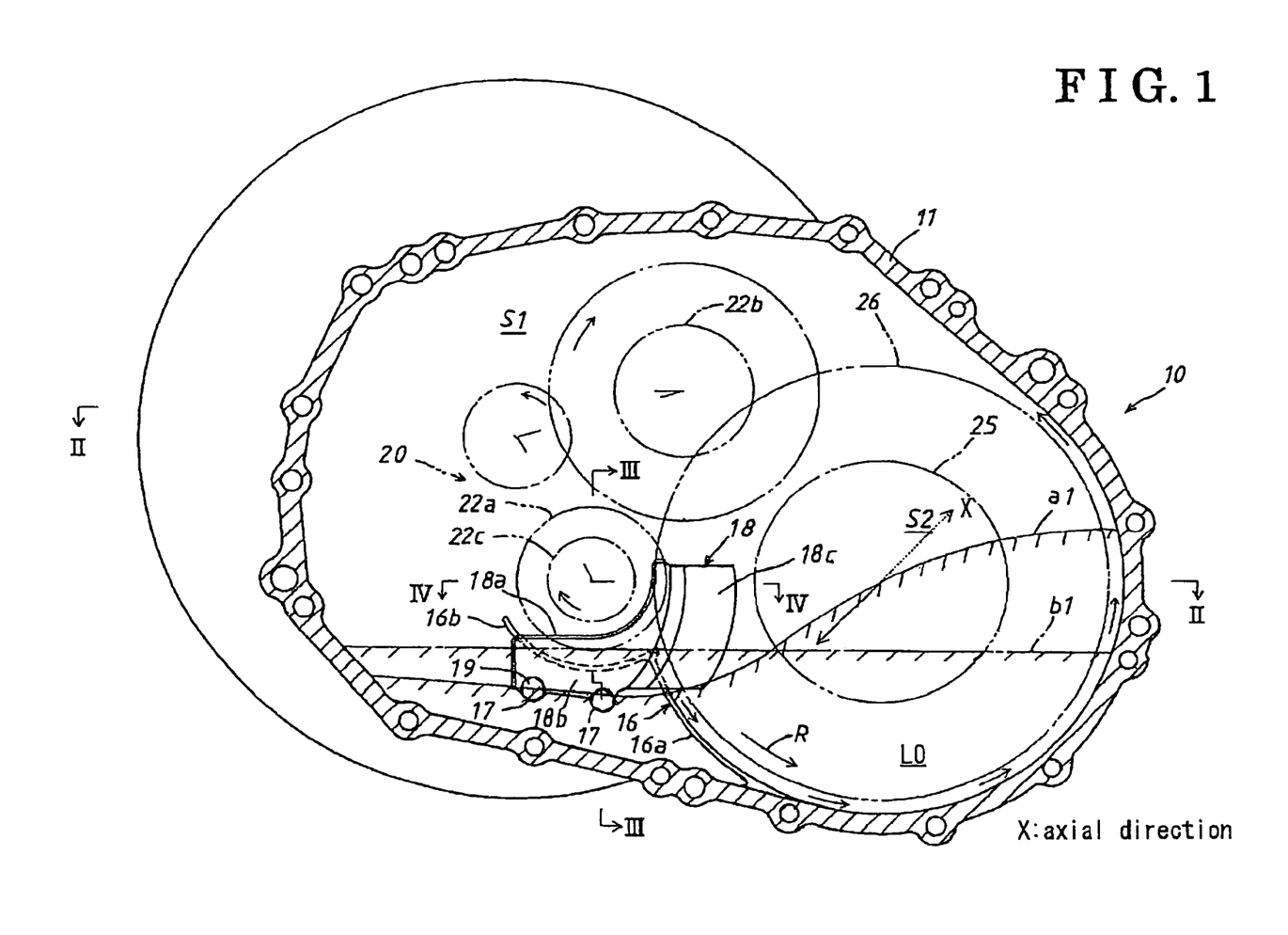
FIG. 1 is a sectional side view taken along line I-I of FIG. 2 illustrating a transmission apparatus for an automobile or the like, according to an embodiment of the present invention.

As shown in FIGS. 1 and 2, the casing 10 includes a first case 11 and a second case 15, which are separated members, are connectable to each other in a liquid-tight manner along an axial direction X of the transmission gear mechanism 20 and the differential mechanism 25. The second case 15 can be integrally fixed to the first case 11 by means of bolts or the like. A first chamber S1 and a second chamber S2, which are formed between the cases 11 and 15, contain and support the transmission gear mechanism 20 and the differential mechanism 25 respectively. The first case 11 includes a first inner surface 10a facing, at a short distance away, an end surface of the ring gear 26 positioned at an axial outer side (lower side as viewed in FIG. 2). The second case 15 includes a second inner surface 10b facing, at a short distance away, an end surface of the pinion 22a positioned at an axial outer side (upper side as shown in FIG. 2). The ring gear 26 is provided near the portion connecting the cases 11 and 15. The cases 11 and 15 include a portion, in which the ring gear 26 is contained, and a part of an inner surface of this portion includes a semi-circular arcuate portion that is coaxially formed with the ring gear 26, at a distance away from a tip circle of the ring gear 26.

Figure 3:
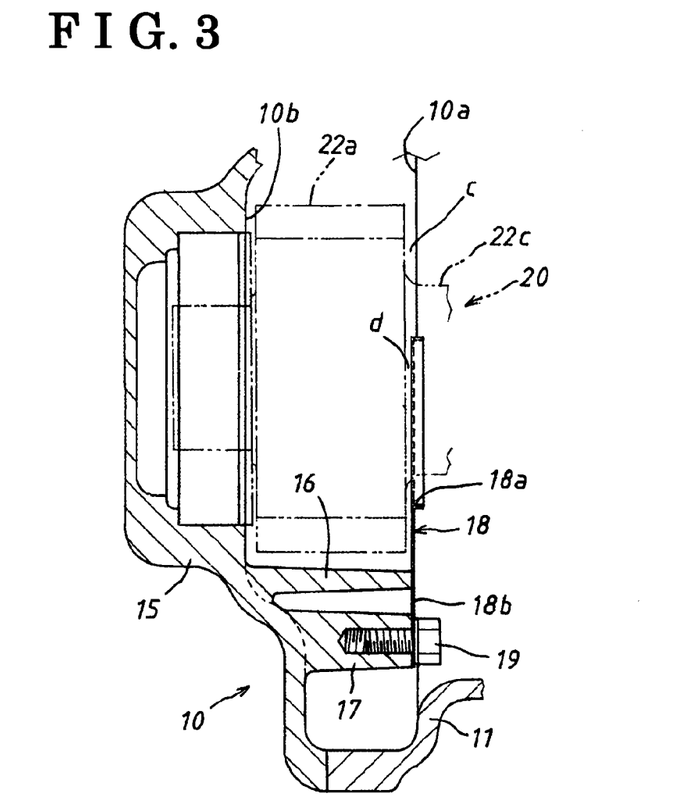
FIG. 3 is a sectional view taken along line III-III of FIG. 1.
Figure 4:
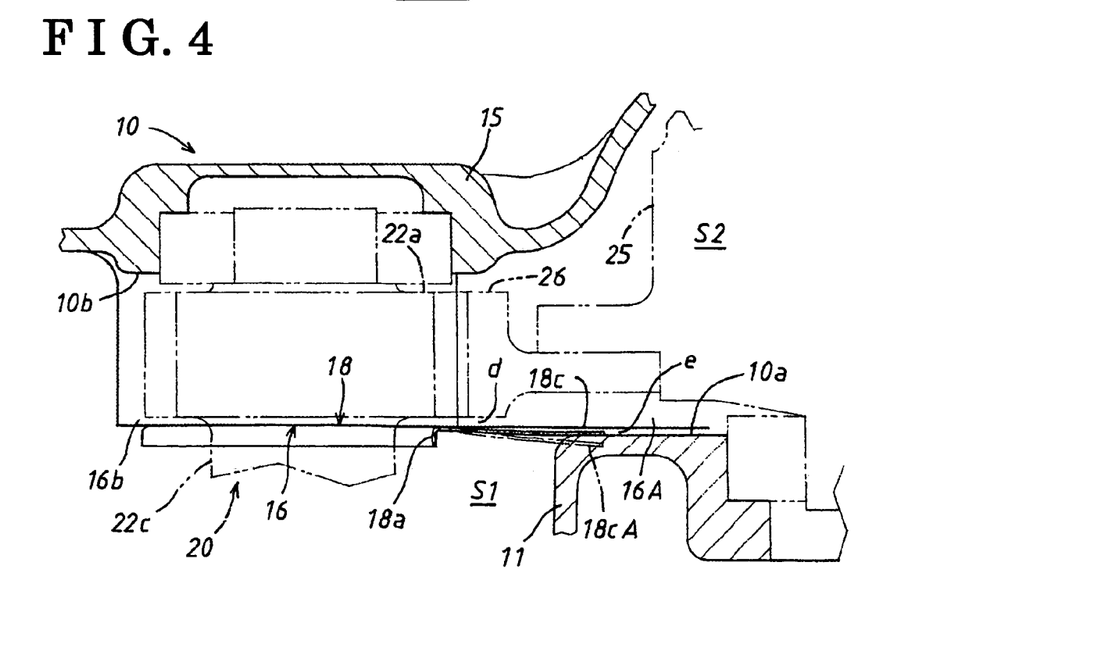
FIG. 4 is a sectional view taken along line IV-IV of FIG. 1.

As shown in FIGS. 1-4, the second inner surface 10b of the second case 15 is integrally formed with a case rib 16, which is formed so as to extend along the undersides of the pinion 22a and a part of the ring gear 26, that is meshed with the pinion 22a, and so as to project toward the first inner surface 10a. The case rib 16 includes a small circular arcuate portion 16b, which is coaxially formed with the pinion 22a and positioned therebelow, and a large circular arcuate portion 16a, which is downwardly extended from the vicinity of a front end portion (right end portion as viewed in FIGS. 1-2) of the small circular arcuate portion 16b along a circumference of the ring gear 26 and is connected to a bottom surface of the second case 15. An inner surface of the large circular arcuate portion 16a substantially matches with a circular arc extended from a semi-circular arcuate inner surface of the second case 15, in which the ring gear 26 is housed. Viewed from a direction perpendicular to the axis line direction of the pinion 22a, a tip surface of the case rib 16 is positioned between the first inner surface 10a and an end surface of the ring gear 26 facing the first inner surface 10a. A space e is hence defined between the tip surface of the case rib 16 and the first inner surface 10a. Within the area where the case rib 16 is provided, the first chamber S1 and the second chamber S2 are connected to each other through the space e. As shown in FIGS. 1 and 3, in order to attach the wall 18 to the second case 15, two boss portions 17, which have identical heights to that of the case rib 16, are formed on the second case 15 at a lower side of the case rib 16.

As shown in FIGS. 1-4, in an operating condition of the transmission apparatus, the wall 18, made of flexible thin metal plate, or the like, controls the flow volume of lubricating oil LO stored in the casing 10. The wall 18 includes a lower portion 18b, which is in contact with a tip surface of the case rib 16, and two boss portions 17, and is assembled onto the second case 15 by means of bolts 19 and the wall 18 further includes an edge portion 18c, which extends toward the differential mechanism 25 to a position where the edge portion 18c overlaps with the first inner surface 10a, and is projected above (upper side in FIG. 1) the case rib 16, through a space c defined between the first inner surface 10a and the end surface of the speed-reducing large gear 26 facing the first inner surface 10a. Accordingly, as viewed from a direction perpendicular to the axis line direction, the wall 18 is positioned between the end surface of the ring gear 26 facing the first inner surface 10a and the first inner surface 10a, and covers, by leaving a space d, a mesh portion of the pinion 22a and the end surface of the ring gear 26 that faces the first inner surface 10a and the underside of the mesh portion. The wall 18 further includes a recessed portion 18a at an opposite side of the edge portion 18c. The recessed portion 18a includes a substantially quarter-circular arcuate portion, which has a slightly larger diameter than that of a shaft portion 22c of the pinion 22a, and is coaxial with the shaft portion 22c, and also includes a straight line portion, which horizontally extends from the lower portion of the quarter-circular arcuate portion. The recessed portion 18a covers, by leaving the space d, a lower portion of the end surface of the pinion 22a facing the first inner surface 10a and also the vicinity of the mesh portion of the pinion 22a and the ring gear 26. The wall 18 is provided with a reinforcing flange formed along an entire length of an edge portion of the recess portion 18a, and a vertical edge portion and a part of an upper edge portion, which both continue from the edge portion of the recess portion 18a. The edge portion 18c of the wall 18, in a free condition, is somewhat folded, as indicated by a chain double-dashed line 18cA shown in FIG. 4, and, in circumstances where the first case 11 is connected to the second case 15 provided with the wall 18, the edge portion 18c is elastically deformed and elastically contacted to the first inner surface 10a.

Figure 6:
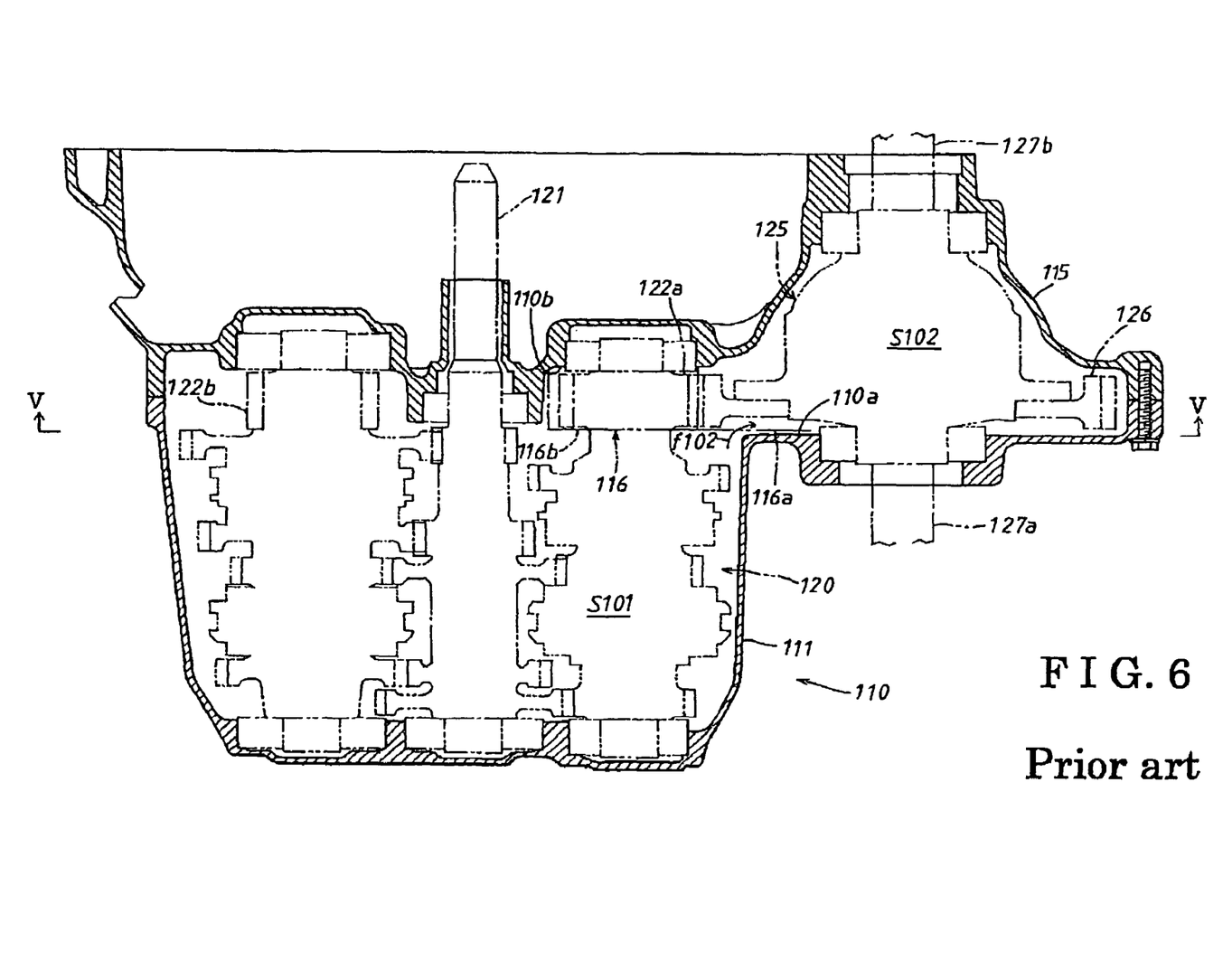
FIG. 6 is a sectional view taken along line VI-VI of FIG. 5.
Figure 7:
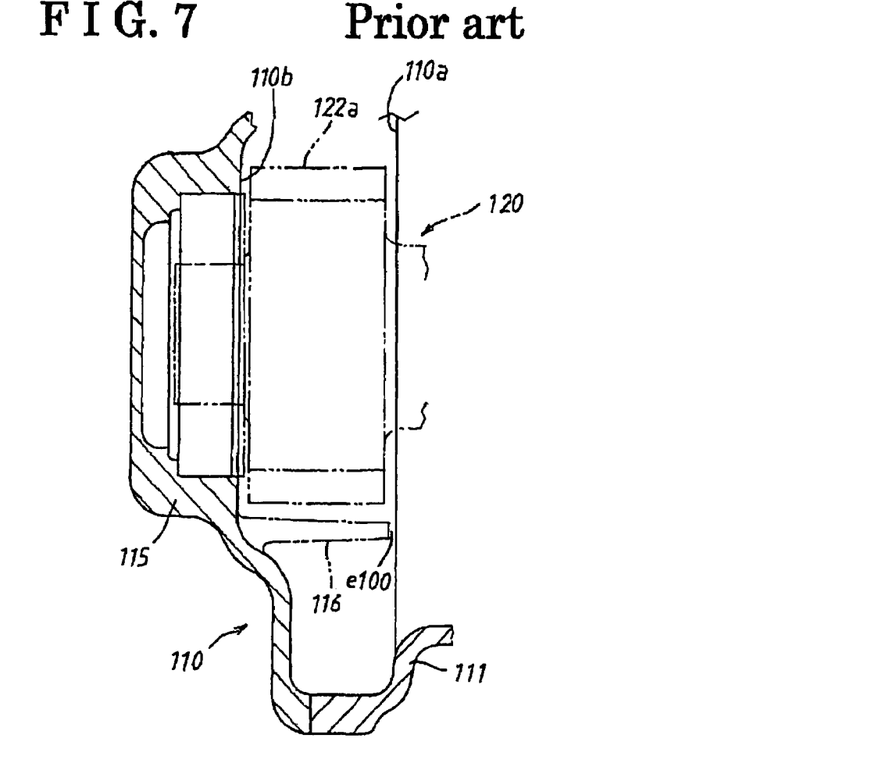
FIG. 7 is a sectional view taken along line VII-VII of FIG. 5.
Figure 8:
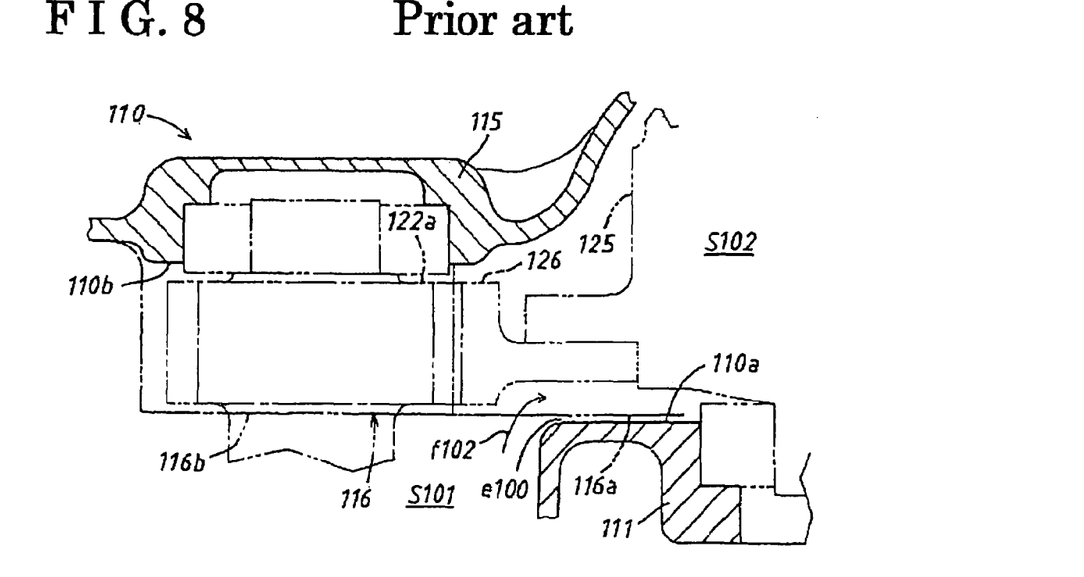
FIG. 8 is a sectional view taken along line VIII-VIII of FIG. 5.

The casing 10 includes the first case 11 and the second case 15, which is provided with the wall 18, and the cases 11 and 15 are fixedly connected to each other, and the first chamber S1 and the second chamber S2 are formed in the casing 10. Each of the lower portions of the first chamber S1 and the second chamber S2 are connected, below the lower edge of the wall 18, through a narrow space e defined between the tip surface of the case rib 16 and the first inner surface 10a, in the same way as to a conventional transmission apparatus provided with a case rib 116. However, within a vertical area where the wall 18 is contacted to the case rib 16, in other words, within a vertical area where the wall 18 overlaps with both the tip surface of the case rib 16 and the first inner surface 10a, the space e is closed by the wall 18 and the flow of lubricating oil LO, as indicated by an arrow f102 shown in FIGS. 6 and 8 illustrating the aforementioned conventional transmission apparatus, is completely interrupted by the wall 18. Thus, fluid resistance against lubricating oil LO flowing into the rear portion of the second chamber S2 from the lower portion of the first chamber S1 is stronger than in the case of the conventional transmission apparatus provided with the case rib 116. Moreover, within a vertical area where the edge portion 18c of the wall 18 is projected above the case rib 16, the first chamber S1 and the second chamber S2 are connected through the narrow space d defined between the wall 18 and the pinion 22a and the speed-reducing large gear 26. Thus, the flow of lubricating oil as indicated by the arrow f102 shown in FIGS. 6 and 8, is virtually interrupted by the wall 18. Moreover, also within this area, fluid resistance against lubricating oil flowing into the rear portion of the second chamber S2 from the first chamber S1 is stronger than in the case of the conventional transmission apparatus provided with the case rib 116.

With the configuration of the transmission apparatus according to the embodiment of the present invention, because, in a stationary condition of the transmission apparatus, the lower portions of the first chamber S1 and the second chamber S2 communicate with each other through the narrow space e, a surface of lubricating oil LO stored in the casing 10 is horizontal, as indicated by a dashed line b1 shown in FIG. 1. In contrast, in an operating condition of the transmission apparatus, lubricating oil LO is lifted or circulated by means of the ring gear 26, which rotates in a direction of an arrow R shown in FIG. 1. Thus, a surface of lubricating oil LO stored in the second chamber S2 is inclined so as to be high in a rear portion of the second chamber S2, which is positioned at the far side of the transmission gear mechanism 20, and low in a front portion of the second chamber S2. Therefore, lubricating oil LO flows into the rear portion of the second chamber S2 from the lower portion of the first chamber S1. However, because fluid resistance against lubricating oil LO flowing into the rear portion of the second chamber S2 from the lower portion of the first chamber S1 is stronger than in the case of the conventional transmission apparatus provided with the case rib 116, an amount of lubricating oil LO flowing into the rear portion of the second chamber S2 can be reduced. As indicated by a solid line a1 shown in FIG. 1, the surface of lubricating oil LO is therefore low in the chamber S1, and in the front portion of the second chamber S2, and is high in the rear portion of the second chamber S2. However, the difference in the highs of the surface of lubricating oil LO stored in the first chamber S1 and that of the second chamber S2 is diminished, and a lowering of the surface of lubricating oil LO stored in the first chamber S1 is thereby reduced to a greater extent than in the case of the conventional transmission apparatus provided with the case rib 116. Therefore, the potential for a lack of lubrication for the transmission gear mechanism 20 contained in the first chamber S1 can be moderated. Accordingly, it becomes possible to set the amount of lubricating oil LO to be inserted into the casing 10 at a lower level than in the case of the conventional transmission apparatus, and a degree of agitating loss of lubricating oil LO caused by a rotation of the ring gear 26 at a high-speed of driving can be reduced.

With the configuration of the embodiment of the present invention, the edge portion 18c of the wall 18, the edge portion 18c which comes in contact with the first inner surface 10a, is projected above the case rib 16. With such a structure, even above the case rib 16, fluid resistance against lubricating oil LO flowed into a front portion of the second chamber S2 from the first chamber S1 is stronger than in the case of the conventional transmission apparatus provided with the case rib 116. Accordingly, the amount of lubricating oil LO, flowing into the lower portion of the second chamber S2 from the lower portion of the first chamber S1 through the above of the case rib 16, can be reduced, and any lowering of the surface of lubricating oil LO stored in the first chamber S1 can thereby be prevented from being increased. Thus, the potential for a lack of lubrication for the transmission gear mechanism 20 contained in the first chamber S1 can be effectively reduced, and by reducing a pre-set value of the lubricating oil LO to be inserted into the casing 10, the agitating loss of lubricating oil LO caused by the rotation of the ring gear 26 at a high-speed of driving can be reduced. However, the present invention is not limited to the aforementioned structure, and for example, depending on the height of the pinion 22a or the shape of the casing 10, the edge portion 18c of the wall 18 may also be provided such as not to project above the case rib 16.

With the configuration of the transmission apparatus according to the embodiment of the present invention, the recessed portion 18a of the wall 18 includes a substantially quarter-circular arcuate portion, which has a smaller diameter than that of a tip circle of the pinion 22a and is coaxial with the shaft portion 22c. The wall 18 covers, at a ring gear 26 side and an under side of the pinion 22a, the end surface of the pinion 22a, which faces the first inner surface 10a, at a short distance away. With this structure, a passage, which connects the first chamber S1 with the second chamber S2 above the case rib 16, includes the narrow space d, which is defined between the wall 18 and the ring gear 26, and the narrow space d, which is defined between the wall 18 and the pinion 22a and is arranged substantially in series with the narrow space d between the wall 18 and the ring gear 26. The narrow space d extends from the vicinity of the pinion 22a to the vicinity of the ring gear 26. Therefore, resistance in the passage is further enhanced. Accordingly, the amount of lubricating oil LO flowing into the lower portion of the second chamber S2 from the lower portion of the first chamber S1 can be further decreased, and the degree of lowering of the surface of lubricating oil LO stored in the first chamber S1 can be further reduced. Thus, the possibility of the lack of lubrication for the transmission gear mechanism 20 contained in the first chamber S1 can be further reduced, and by a further lowering of the pre-set value of the lubricating oil LO to be inserted into the casing 110, the degree of agitating loss of lubricating oil LO resulting from the rotation of the ring gear 26 at a time of high-speed driving can be further reduced. However, the present invention is not limited to the above. For example, the present invention can be applied to a structure, in which the substantially quarter-circular arcuate portion of the recessed portion 18a is a larger diameter than that of a tip circle of the pinion 22a so that the wall 18 does not cover the end surface of the pinion 22a that faces the first inner surface 10a. A transmission apparatus including such a structure can also, in practice, produce the same results and effects as those described above.

With the configuration of the transmission apparatus according to the embodiment of the present invention, the casing 10 is divided into the first case 11, which is formed with the inner surface 10a, and the second case 15, which is formed with the second inner surface 10b. The wall 18 being a flexible plate includes the lower portion 18b, which is assembled onto the tip surface of the case rib 16 formed on the second case 15, and the edge portion 18c, which is positioned on the final driving mechanism 25 side and is elastically contacted to the first inner surface 10a of the first case 11. With the aforementioned structure, notwithstanding errors in the manufacturing of each component, the edge portion 18c of the wall 18 can reliably come in contact with the first inner surface 10a of the first case 11, and the amount of the lubricating oil LO flowing into the second chamber S2 from the first chamber S1 can thereby be stabilized. Accordingly, heights of the surfaces of oil stored in each chamber can be stabilized, and without setting excessive levels of lubricating oil LO for insertion into the casing 10, the agitating loss of lubricating oil LO can also be stabilized. Moreover, abnormal noises, caused by the edge portion 18c of the wall 18, which is connected to, and disconnected from, the first inner surface 10a, for example by oscillation, can be prevented. However, the present invention is not limited to the above. For example, the wall 18 may be made of a rigid material. A transmission apparatus including such a structure can also achieve the same results and effects as those described above With the configuration of the transmission apparatus according to the embodiment of the present invention, the transmission gear mechanism 20 contained in the first chamber S1 includes two intermediate shafts. However, the present invention is not limited to such a structure. For example, the transmission gear mechanism 20 contained in the first chamber S1 may include one intermediate shaft.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A transmission apparatus for an automobile comprising:
    a transmission gear mechanism including, therein, a speed-reducing small gear at an axial one side of an intermediate shaft;
    a final driving mechanism including, therein, a speed-reducing large gear at an axial one side of an axle, the speed-reducing large gear being engaged with the speed-reducing small gear;
    a casing including:
        a first chamber housing, therein, the transmission gear mechanism;
        a second chamber housing, therein, the final driving mechanism;
        a first inner surface facing, at a distance away, an end surface of the speed-reducing large gear positioned at a side of the first chamber housing, therein, the transmission gear mechanism;
        a second inner surface facing, at a distance away, an end surface of the speed-reducing small gear positioned at a side of the first chamber housing, therein, the transmission gear mechanism; and
        a case rib formed at the second inner surface, and projecting toward the first inner surface along undersides of the speed-reducing small gear, and of the speed-reducing large gear that meshes with the speed-reducing small gear, the case rib being connected to a bottom surface of the casing; and
    a wall which, viewed from a direction perpendicular to an axial direction of the speed-reducing large gear, is positioned between the first inner surface and the end surface of the speed-reducing large gear that faces the first inner surface; the wall including:
        a lower portion fixedly attached to a tip end surface of the case rib; and
        an edge portion arranged at a side of the final driving mechanism and elastically in contact with the first inner surface; and the wall covering, at a distance away, the end surface of the speed-reducing large gear that faces the first inner surface.

2. The transmission apparatus according to claim 1, wherein the edge portion of the wall being elastically in contact with the first inner surface is projected above the case rib.

3. The transmission apparatus according to claim 1, wherein the wall covers, at a side of the speed-reducing large gear and an under side of the speed-reducing small gear, the end surface of the speed-reducing small gear facing the first inner surface at a distance away.

4. The transmission apparatus according to claim 2, wherein the wall covers, at a side of the speed-reducing large gear and an under side of the speed-reducing small gear, the end surface of the speed-reducing small gear facing the first inner surface at a distance away.

5. The transmission apparatus according to claim 1, wherein the casing includes a first case having the first inner surface and a second case having the second inner surface, which cases are separated members and are fixedly connectable with each other in an axial direction and in a liquid-tight manner, the wall being a flexible plate is fixed to the second case with the lower portion being adjusted to come in contact with the tip surface of the case rib, and the edge portion elastically comes in contact with the first inner surface.

6. The transmission apparatus according to claim 2, wherein the casing includes a first case having the first inner surface and a second case having the second inner surface, which cases are separated members and are fixedly connectable with each other in an axial direction and in a liquid-tight manner, the wall being a flexible plate is fixed to the second case with the lower portion being adjusted to come in contact with the tip surface of the case rib, and the edge portion elastically comes in contact with the first inner surface.

7. The transmission apparatus according to claim 3, wherein the casing includes a first case having the first inner surface and a second case having the second inner surface, which cases are separated members and are fixedly connectable with each other in an axial direction and in a liquid-tight manner, the wall being a flexible plate is fixed to the second case with the lower portion being adjusted to come in contact with the tip surface of the case rib, and the edge portion elastically comes in contact with the first inner surface.

* * * * *